(12) United States Patent
Hong (10) Patent No.: US 9,674,278 B1
(45) Date of Patent: Jun. 6, 2017

(54) GEOGRAPHIC DATA MANAGEMENT SERVER

(71) Applicant: Palantir Technologies Inc., Palo Alto, CA (US)

(72) Inventor: Peter Hong, Kalamazoo, MI (US)

(73) Assignee: Palantir Technologies Inc., Palo Alto, CA (US)

(*) Notice: Subject to any disclaimer, the term of this patent is extended or adjusted under 35 U.S.C. 154(b) by 0 days.

(21) Appl. No.: 15/273,480

(22) Filed: Sep. 22, 2016

Related U.S. Application Data (60) Provisional application No. 62/370,629, filed on Aug. 3, 2016.

(51) Int. Cl.
*G06F 15/16* (2006.01)
*H04L 29/08* (2006.01)
*H04L 29/06* (2006.01)

(52) U.S. Cl.
CPC .......... *H04L 67/1025* (2013.01); *H04L 67/18* (2013.01); *H04L 67/2842* (2013.01); *H04L 67/42* (2013.01)

(58) Field of Classification Search
CPC ... G01C 21/26; G01C 21/32; G06F 17/30241; H04L 67/18; H04L 67/2842; H04L 67/42
USPC .......................................... 709/203; 345/440
See application file for complete search history.

(56) References Cited

U.S. PATENT DOCUMENTS

| | | | | |
|---|---|---|---|---|
| 6,073,076 A | * | 6/2000 | Crowley | G01C 21/26 701/400 |
| 6,370,539 B1 | * | 4/2002 | Ashby | G01C 21/26 701/532 |
| 8,971,928 B2 | * | 3/2015 | Barnes | G01C 21/367 455/456.3 |

* cited by examiner

*Primary Examiner* — Frantz Jean
(74) *Attorney, Agent, or Firm* — Schwegman Lundberg & Woessner, P.A.

(57) ABSTRACT

Aspects of the present disclosure relate to a tile management server. The management server receives, from a client device, a request for geographic data, the request having a management server request format. The management server selects a first geographic server, out of multiple geographic servers, for processing the request. The management server translates the request from the management server request format into a first geographic server request format. The first geographic server request format is for communicating with the first geographic server. A second geographic server from among the plurality of geographic servers communicates using a second geographic server request format different from the first geographic server request format. The management server transmits, to the first geographic server, the request translated into the first geographic server request format in order to cause the first geographic server to provide the geographic data to the client device.

20 Claims, 6 Drawing Sheets

GEOGRAPHIC DATA MANAGEMENT SERVER

PRIORITY CLAIM

This application claims priority to U.S. Provisional Patent Application No. 62/370,629, filed on Aug. 3, 2016, entitled "MAP TILE MANAGEMENT SERVER," the entire content of which is incorporated herein by reference.

TECHNICAL FIELD

The present disclosure generally relates to machines configured to the technical field of special-purpose machines that store and manage geographic data, including computerized variants of such special-purpose machines and improvements to such variants, and to the technologies by which such special-purpose machines become improved compared to other special-purpose machines that provide geographic data access technology. In particular, the present disclosure addresses systems and methods for generating and displaying geographic data.

BACKGROUND

A geographic data access application of a client device may access geographic data stored on several different servers. Each server may have its own format for geographic data requests. The geographic data access application may receive a request, from a user, for geographic data of an identified geographic region and provide the requested geographic data. In providing the requested geographic data, the geographic data access application may need to determine an appropriate server to use to process the request and to provide the request, to the server, in the request format for that server. This may be a cumbersome process.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Some aspects of the subject technology address the problem in the computer arts of obtaining geographic data, such as tiles, for the display of the geographic data at a client device. According to some implementations, the solution to the problem of obtaining the geographic data includes receiving, at a management server and from a client device, a request for geographic data of an identified geographic region. The geographic data includes one or more tiles. The request has a management server request format. The management server selects, based on the request or based on the identified geographic region, a first geographic server for processing the request. The first geographic server is selected out of multiple geographic servers. The management server translates the request from the management server request format into a first geographic server request format. The first geographic server request format is operable to communicate with the first geographic server. A second geographic server from among the multiple geographic servers communicates using a second geographic server request format different from the first geographic server request format. The management server transmits, to the first geographic server, the request translated into the first geographic server request format in order to cause the first geographic server to provide the geographic data to the client device. As used herein, a geographic server may include a map server or any other server that stores or accesses (e.g., from a database or other data structure) geographic data. Geographic data may include map data or any other geographic data. The tiles may be map tiles or any other tiles.

Figure 1:
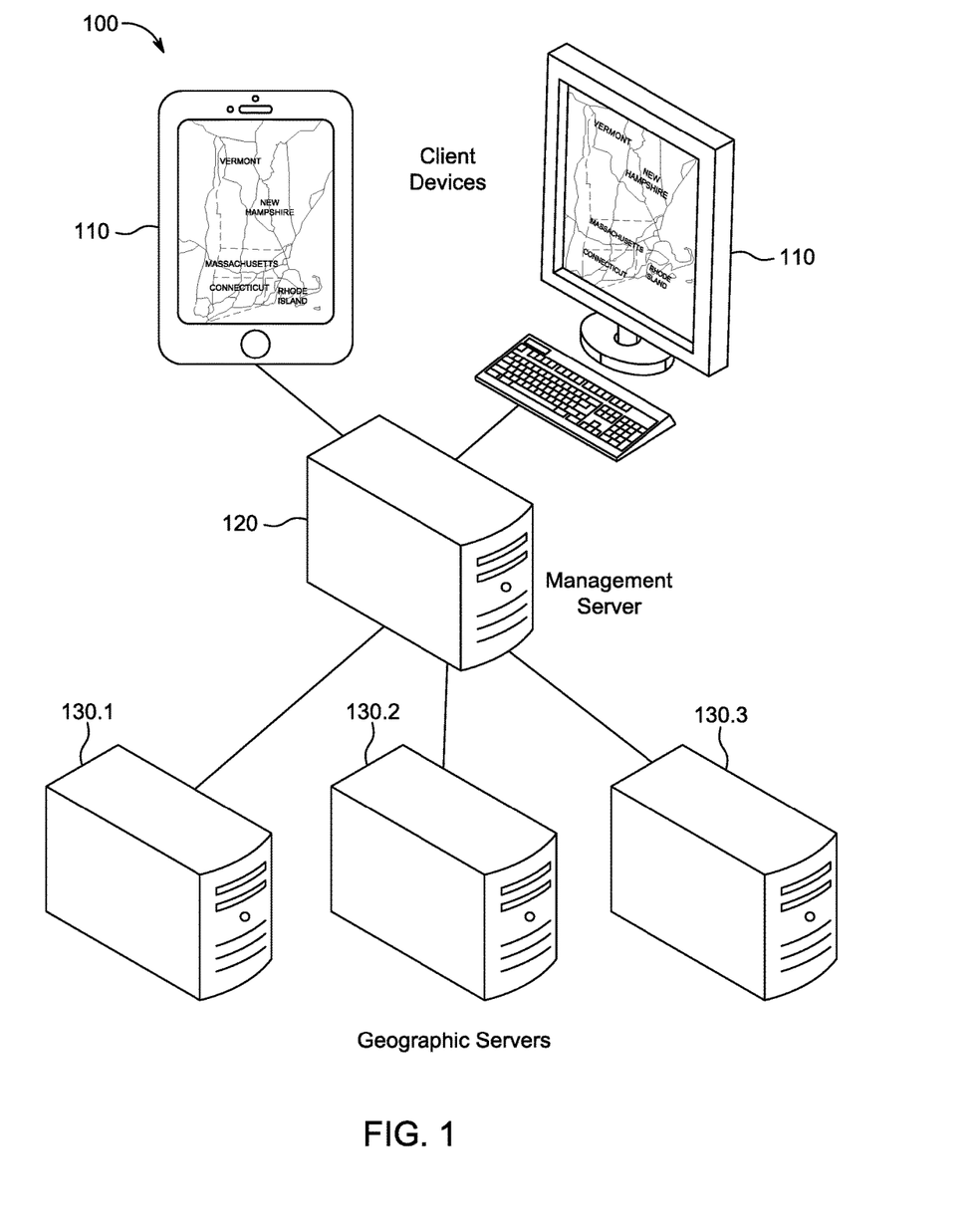
FIG. 1 illustrates an example system in which geographic data is loaded from server(s) and provided to client device(s), according to some embodiments.

FIG. 1 illustrates an example system 100 in which geographic data is loaded from server(s) and provided to client device(s), according to some embodiments. As shown, the system 100 includes client devices 110, a management server 120, and geographic servers 130, which communicate with one another over a network. The network may include one or more of a local area network, a wide area network, a mobile network, an Institute of Electrical and Electronic Engineers (IEEE) 802.11 Standard (WiFi) network, the Internet, an intranet, a virtual private network (VPN), and the like.

Each client device 110 may include one or more of a desktop computer, a laptop computer, a mobile phone, a tablet computer, a personal digital assistant (PDA), a smart watch, and the like. As shown, each client device 110 displays geographic data, which may be provided to the client device, via the network, by use of a geographic data access application (e.g., a mapping application). The geographic data access application may reside at (e.g., be stored in the local memory of) the client device 110.

The geographic servers 130 store tiles (or are coupled with data repositories, such as databases, that store tiles). Each geographic server 130 may be responsible for generating geographic data for a geographic region associated with that geographic server 130. In some cases, some of the geographic server(s) 130 store tiles for overlaying other tile(s) of geographic data with topographic information, traffic information, public transit information, airline flight routes, business names and geographic locations, real estate prices, and the like. As shown, there are 3 geographic servers 130.1-3. However, the subject technology may be implemented with any number of geographic servers (e.g., 100, 1000, 10,000, etc.).

As used herein, the terms "tile" or "tile" encompass their plain and ordinary meaning. A tile may store a portion of geographic data at a given zoom level as an image taking up a predefined area measured in pixels (e.g., 256 pixels by 256 pixels). In one example, a first tile includes a map of the United States showing only major cities and major interstate highways. A second tile includes a map of California showing large and mid-sized cities with interstate and major state highways. A third tile includes a map of San Francisco showing its largest streets. A fourth tile includes a map of the Marina neighborhood of San Francisco and shows all of the streets, parks, and major landmarks in that neighborhood. Additional tiles may be used to overlay the map of the Marina neighborhood (or other geographic data) with topography, business names and geographic locations, real estate prices, and the like.

The management server 120 is configured to manage the geographic servers 130 and to broker communications between the client device(s) 110 and the geographic server(s) 130. For example, the management server 120 is configured to carry out the methods described below in conjunction with FIGS. 2-4. A more detailed example of the structure of the management server 120 is shown in FIG. 5, according to some embodiments. It should be noted that the structure of the management server 120 is not limited to the one shown in FIG. 5, and the management server 120 may implement other methods in addition to or different from those described in FIGS. 2-4.

As used herein, the term "configured" encompasses its plain and ordinary meaning. In some cases, a machine is configured to carry out functions by having the functions stored in software memory. Alternatively, the functions may be hardwired into processor(s) or memory of the machine.

FIG. 1 illustrates the system 100 in which the subject technology may be implemented. In the system 100, the client device 110 has a geographic data access application. When executing the geographic data access application, the client device 100 transmits, to the management server 120 a request for geographic data of an identified geographic region (e.g., eastern New England, as shown in FIG. 1). The request may include additional data (e.g., a request for overlaying the geographic data with traffic information, topography information, current weather conditions, and the like). The request may identify one or more tiles, stored at the geographic servers 130, to be provided to the client device 110. Alternatively, the tiles to be provided may be determined based on a screen size of the client device 110 and dimensions of the identified geographic region. The request is provided, from the client device 110 to the management server 120, in a management server request format, which may be programmed into the geographic data access application of the client device 110.

Upon receiving the request, the management server 120 selects, based on the request or based on the identified geographic region, a first geographic server 130.1 for processing the request. The first geographic server 130.1 is selected out of multiple geographic servers 130 (e.g., the three geographic servers 130.1-3 shown in FIG. 1 or hundreds or thousands of geographic servers). For example, different geographic servers 130 may be responsible for providing geographic data of different regions of the world, with some of the geographic servers 130 being responsible for providing traffic conditions, weather conditions, topography, average real estate prices, and the like.

The management server 120 translates the request from the management server request format into a first geographic server format for the first geographic server 130.1. The first geographic server request format is for communicating with the first geographic server 130.1. A second geographic server 130.2 from among the multiple geographic servers 130 communicates using a second geographic server request format different from the first geographic server request format. The first geographic server request format is different from the management server request forma. Different geographic server request formats may exist, for example, because different developers at different organizations created the software for different geographic servers 130.

The management server 120 transmits, to the first geographic server 130.1, the request translated into the first geographic server request format in order to cause the first geographic server to provide geographic data to the client device 110. Upon receiving the translated request, the first geographic server 130.1 provides the requested geographic data to the client device 110. The geographic data access application of the client device 110 causes the client device to display the requested geographic data.

In some examples, the management server 120 has a cache that serves as a geographic server. Recently accessed tiles are stored in the cache. There may be multiple additional geographic servers 130 different from the cache of the management server 120.

Figure 2:
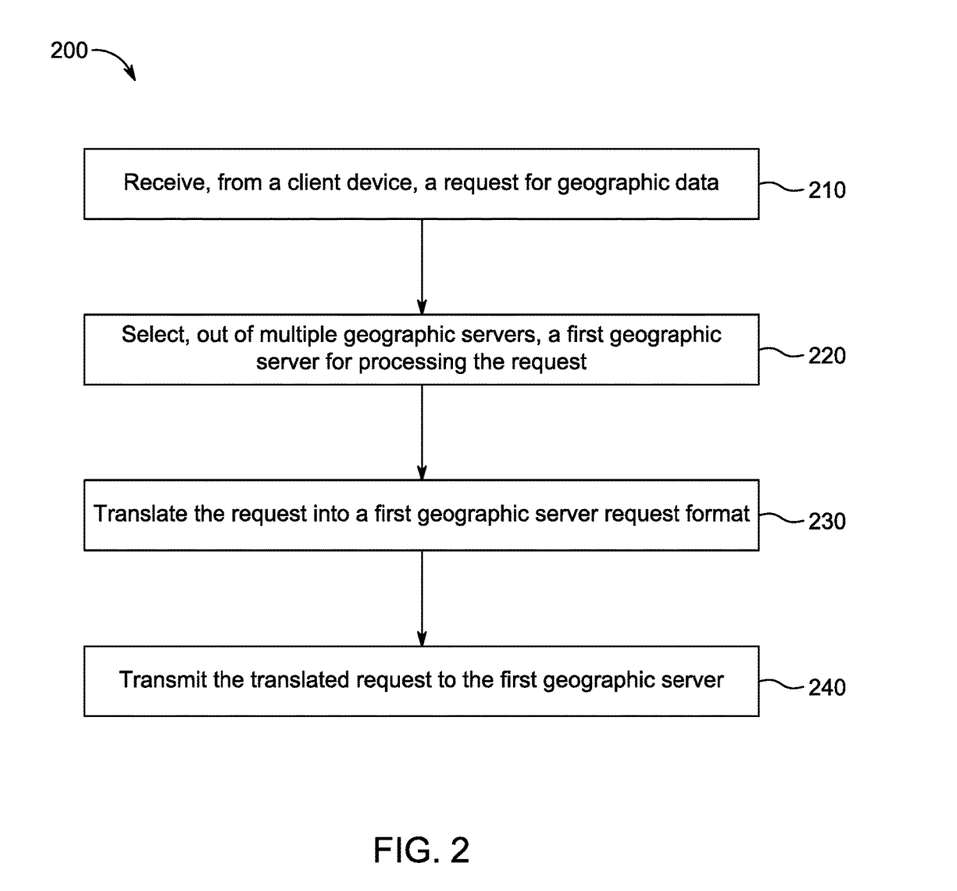
FIG. 2 is a flow chart of an example method for providing a request for geographic data to a server, according to some embodiments.

FIG. 2 is a flow chart of an example method 200 for providing a request for geographic data to a server. In some cases, the method 200 is implemented at the management server 120.

At operation 210, the management server 120 receives, from the client device 110, a request for geographic data of an identified geographic region. In some cases, the request includes a scale level or a size (e.g., a size of a screen or a window on which the geographic data is to be displayed). The request has a management server request format.

At operation 220, the management server 120 selects, based on the request or based on the identified geographic region, a first geographic server 130.1 for processing the request. The first geographic server is selected out of multiple geographic servers 130.1-3. In some cases, the management server 120 determines that some of the geographic servers 130.1-3 are unavailable. In these cases, the first geographic server is selected from among the geographic servers 130.1-3 that are available. For example, the management server 120 monitors the multiple geographic servers 130.1-3 to verify that each of the multiple geographic servers is online and has access to its tiles. The management server 120 determines that a geographic server 130.3 is offline or does not have access to its tiles. Accordingly, the management server 120 selects the geographic server 130.1 for processing the request from among the geographic servers 130.1-2 (but not 130.3) that are online and have access to their tiles.

At operation 230, the management server 120 translates the request from the management server request format into a first geographic server request format. The first geographic server request format is for communicating with the first geographic server 130.1. A second geographic server 130.2 from among the plurality of geographic servers 130 communicates using a second geographic server request format different from the first geographic server request format. As used herein, translation refers to operations to get geographic data from a first format (e.g., source format or management server request format) into a second format (e.g., desired format or first geographic server request format). In some cases, translation involves two or more translation operations. Some examples of translation are discussed below.

At operation 240, the management server 120 transits, to the first geographic server 130.1, the request translated into the first geographic server request format in order to cause the first geographic server 130.1 to provide the map to the client device 110. Upon receiving the request translated into the first geographic server request format, the first geographic server 130.1 provides the requested geographic data of the identified geographic region to the client device 110 for display and to the management server 120 for caching in a cache of the management server 120. The caching of geographic data at the management server 120 is described in more detail in conjunction with FIG. 3 and FIG. 5.

One example of translation is translating a tile request into another styling format. In some cases, the geographic servers 130 deliver tiles with set color schemes, hue, and the like. However, the client device 110 may request tiles with a certain visual style or other modifications to the visual representation of the map data. In some cases, the parameters to do this are non-existent, in an odd syntax (e.g., the geographic server 130 may require providing colors as a hex string in a particular format), or otherwise non-standard. The management server 120 stores instructions regarding how to translate these stylistic requests apply transformations on the raster/vector geographic data as necessary, and return the client-requested styled tile.

One example of translation includes translating a raster tile request not supported by the geographic server 130. Specifically, the client device 110 may request, via the management server 120, geographic data with a resolution either not supported by the geographic server 130 or requiring multiple requests. For instance, a geographic server 130 may only support 256×256 pixel raster tiles. But if a client device 110 requests a tile that is 123×1024 pixels, this actually requires a few operations: (1) request, from the geographic server 130, all the 256×256 pixel tiles that intersect the 123×1024 request; (2) composite together the 256×256 pixel tiles into one single tile; and (3) cut and stretch/scale the tile to turn it into the 123×1024 pixel requested tile. These operations are handled by the management server 120.

One example of translation is translating a client request from one syntax to another syntax. Some geographic servers 130 may process requests having coordinates, representing the four corners of a square. Some client devices 110 support requesting a tile with a relative coordinate system, that has a mathematical, but no other obvious relationship to the coordinates. For instance, the geographic server 130 uses the coordinates [(10, 10), (10, 0), (0, 10), (0, 0)] for a tile representing a specified geographic region (e.g., the State of Colorado). However, the client device 110 represents this same geographic region as 1/2/3. The management server 120 translates these various reference systems so that client devices 110 can ask for tiles in their supported syntaxes, regardless of if the underlying geographic server 130 supports another format.

One example of translation is translating a raster (image) tile into another format. Some geographic servers 130 provide JPEG raster files. However, some client devices 110 may request PNG or other raster formats to support some features, such as transparency or other color encoding. In this case, the translation includes the management server 120 converting the image into the raster format requested by the client device 110.

In some cases, the management server 120 transmits, to the first geographic server 130.1, in conjunction with the request translated into the first geographic server request format, a security element for accessing the first geographic server. In some examples, the security element for accessing the first geographic server 130.1 includes one or more of a password, a certificate, a key, a username and password combination, and the like. The security element for accessing the first geographic server 130.1 is different from a security element for accessing the second geographic server 130.2, and each of the geographic servers 130 is associated with its own security element. The security elements for accessing the multiple geographic servers 130 are stored at the management server 120 and reside at the management server 120.

Figure 3:
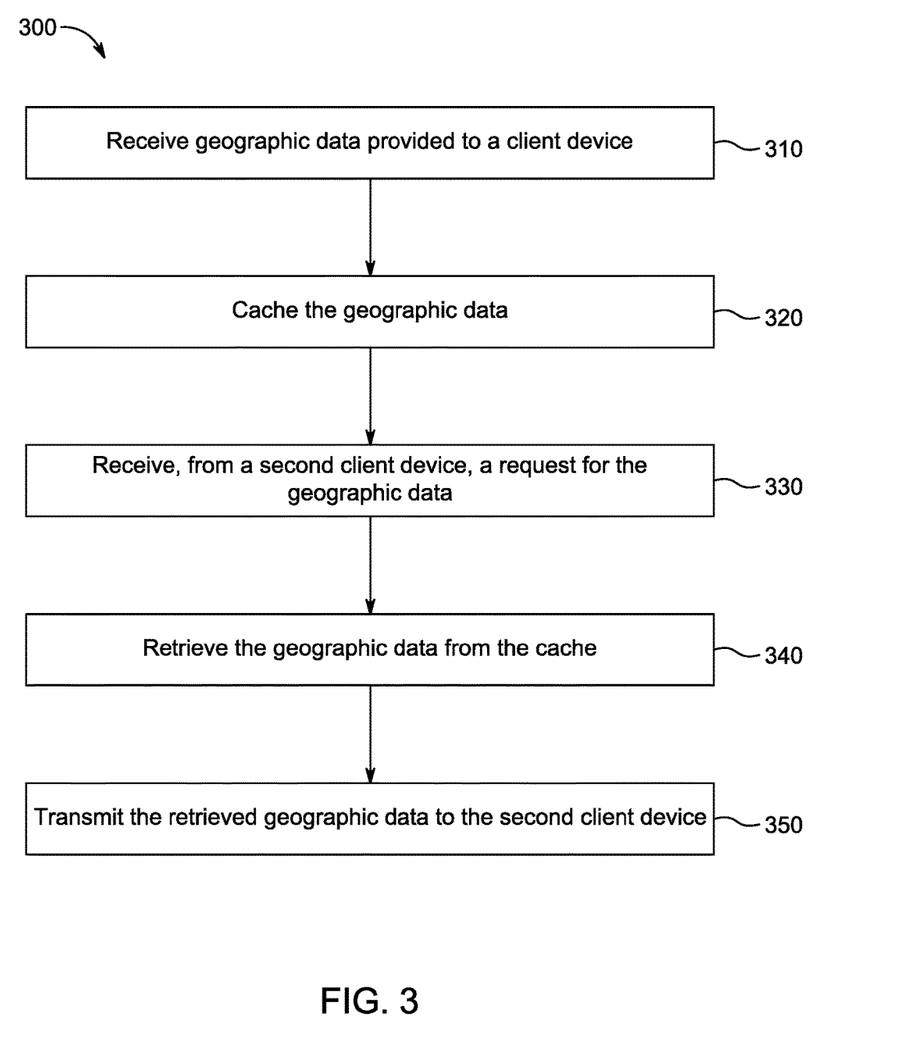
FIG. 3 is a flow chart of an example method for providing cached geographic data to a client, according to some embodiments.

FIG. 3 is a flow chart of an example method 300 for providing cached geographic data to a client. In some cases, the method 300 is implemented at the management server 120. In some cases, the method 300 is implemented after the method 200. Alternatively, the method 300 may be implemented before or in parallel with the method 200. In some cases, the method 300 is implemented, and the method 200 is not implemented at all.

At operation 310, the management server 120 receives, from the first geographic server 130.1, the geographic data provided to the client device 110. At operation 320, the management server 120 caches the received geographic data at a local cache unit of the management server 120. At operation 330, the management server 120 receives, from a second client device 110 (different from the client device to which the geographic data was provided in operation 310), a request for the geographic data (or geographic data that includes at least a portion of the tiles from the geographic data received in operation 310). At operation 340, the management server 120 retrieves, in response to the request for the geographic data from the second client device 110, the geographic data from the cache of the management server 120. At operation 350, the management server transmits the retrieved geographic data to the second client device 110. In some cases, the cache of the management server 120 may serve as one of the multiple geographic servers 130.

Figure 4:
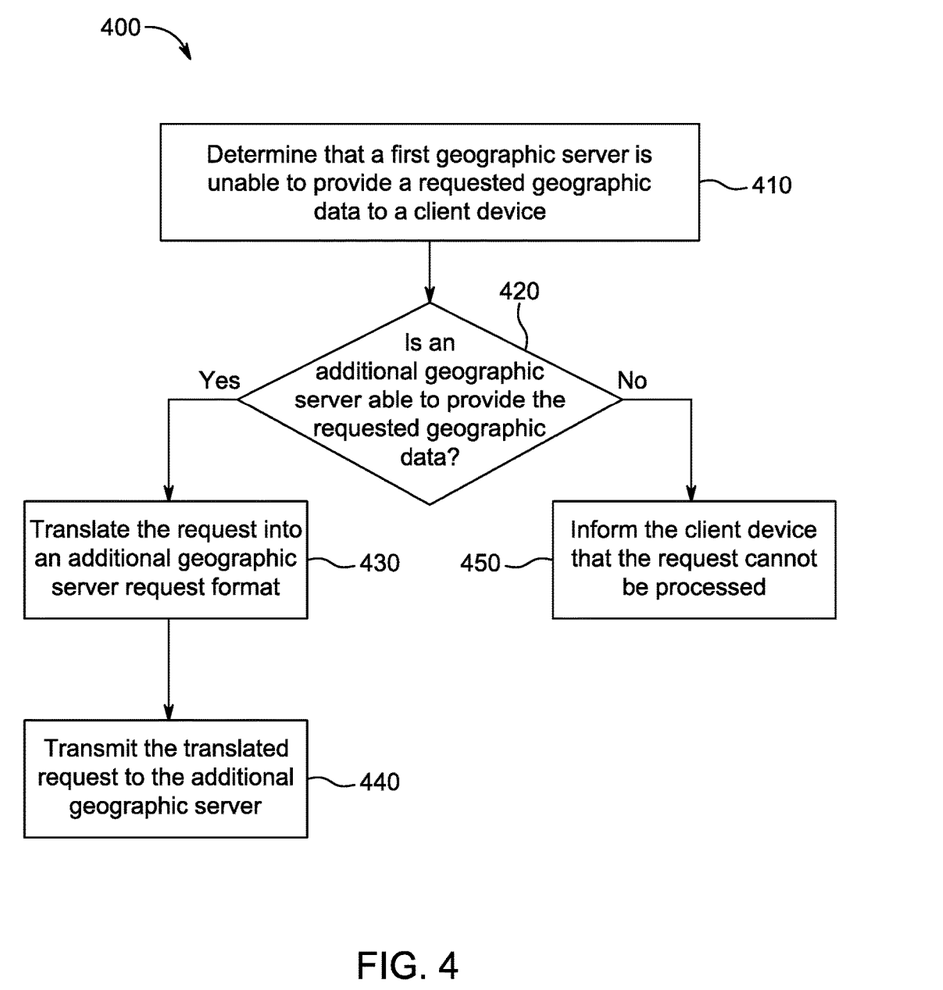
FIG. 4 is a flow chart of an example method for processing a request for geographic data, according to some embodiments.
Figure 5:
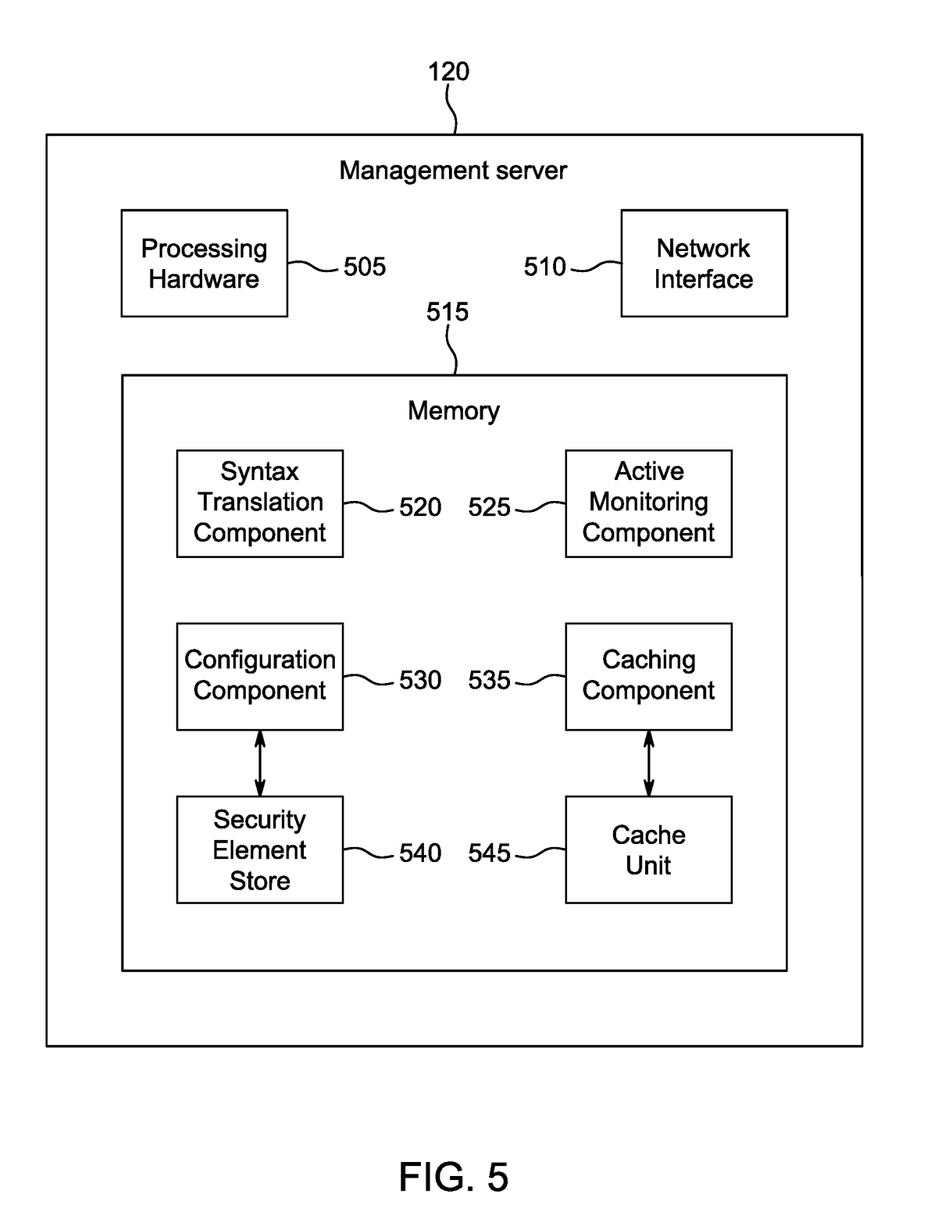
FIG. 5 is a block diagram illustrating an example of the management server of FIG. 1, according to some embodiments.

FIG. 4 is a flow chart of an example method 400 for processing a request for geographic data. In some cases, the method 400 is implemented at the management server 120. In some cases, the method 400 is implemented in conjunction with the method 200. Alternatively, the method 400 may be implemented independently of the method 200 or without implementing the method 200.

At operation 410, the management server 120 determines that the first geographic server 130.1 is unable to provide the requested geographic data to the client device 110. In some examples, the first geographic server 130.1 may be unable to provide the requested geographic data because the first geographic server 130.1 is offline or lacks access to its tiles (e.g., lacks access to a data repository or database coupled with the first geographic server 130.1).

At operation 420, the management server 120 determines whether an additional geographic server 130.k, from among the multiple geographic servers 130.2-3 excluding the first geographic server 130.1, is able to provide the requested geographic data (thus, k is a number between 2 and 3). For example, the management server 120 determines that the additional geographic server 130.k is online and that the additional geographic server 130.k has access to the geographic data of the identified geographic region requested by the client device 110. If the additional geographic server 130.k is able to provide the requested geographic data, the method 400 continues to operation 430. If the additional geographic server 130.k is unable to provide the requested geographic data, the method 400 continues to operation 450.

At operation 430, upon determining that the additional geographic server 130.k is able to provide the requested geographic data, the management server 120 translates the request (for the geographic data) from the management server request format into an additional geographic server request format. The additional geographic server request format is for communicating with the additional geographic server, and is different from the first geographic server request format and the management server request format.

At operation 440, the management server 120 transmits, to the additional geographic server 130.k, the request translated into the additional geographic server request format in order to cause the additional geographic server 130.k to provide the geographic data to the client device 110. Upon receiving the request in the additional geographic server request format, the additional geographic server 130.k provides the geographic data to the client device 110. After operation 440, the method 400 ends.

At operation 450, upon determining that the additional geographic server 130.k is unable to provide the requested geographic data, the management server 120 informs the client device 110 that the request for the geographic data cannot be processed. For example, the management server 120 provides, to the client device 110 for display thereat, text or images indicating that the request for the geographic data cannot be processed. After operation 450, the method 400 ends.

FIG. 5 is a block diagram illustrating an example of the management server 120 of FIG. 1. As shown, the management server 120 includes processing hardware 505, a network interface 510, and a memory 515. The processing hardware 505 includes one or more processors which are capable of carrying out software instructions stored in the memory 515 or another machine-readable medium. The one or more processors are also capable of carrying out instructions hard-wired into the one or more processors. The network interface 510 allows the management server 120 to communicate with other machines, including the client device(s) 110 and the geographic server(s) 130, over one or more networks. The memory 515 stores data or instructions. As shown, the memory 515 includes a syntax translation component 520, an active monitoring component 525, a configuration component 530, a caching component 535, a security element store 540, and a cache unit 545.

The syntax translation component 520 is configured to translate a request for geographic data, received from a client device, from the management server request format to a format associated with the geographic server 130 that is to handle the request. For example, the syntax translation component is configured to carry out the method 200 of FIG. 2. As a result of the operation of the syntax translation component 520, the system 100 and the management server 120 are agnostic to any sort of input geo-syntax (from client device(s) 110) and output geo-syntax (to geographic server(s) 130).

The active monitoring component 525 is configured to provide strong monitoring and resiliency. The active monitoring component 525 monitors the multiple geographic servers 130 and determines if one of the geographic servers 130 becomes unreachable (e.g., due to being offline or due to an internal failure of the geographic server 130). If the client device 110 requests geographic data that that resides at an unreachable geographic server 130, and does not reside at a geographic server 130 that is reachable, the active monitoring component 525 is configured to alert the client device 110 that the request cannot be fulfilled. In some examples, the active monitoring component 525 is configured to carry out the method 400 of FIG. 4.

As discussed above, each geographic server 130 has a different process for accessing the geographic server 130, which may include different security elements (e.g., passwords, certificates, or keys). These secure elements are stored, at the management server 120, in the security element store 540. When a client device 110 attempts to access a geographic server 130 through the management server 120 (e.g., via the method 200 of FIG. 2), the configuration component 530 provides the appropriate security element for accessing that geographic server 130. As a result, the client device 110, and the geographic data access application residing thereat, might, in some cases, forego storing security elements locally (or having the user memorize the security elements).

The caching component 535 is configured to cache tiles that are frequently accessed from the geographic servers 130 at a local memory of or coupled to the management server 120. For example, the caching component 535 is configured to cache the tiles at the cache unit 545. In some examples, the caching component 535 caches the tiles in the cache unit 545 by operation of the method 300 of FIG. 3. In some cases, the tiles may be cached at the cache unit 545 of the management server 120 in a different format from the format in which they are stored at the geographic server 130.

Figure 6:
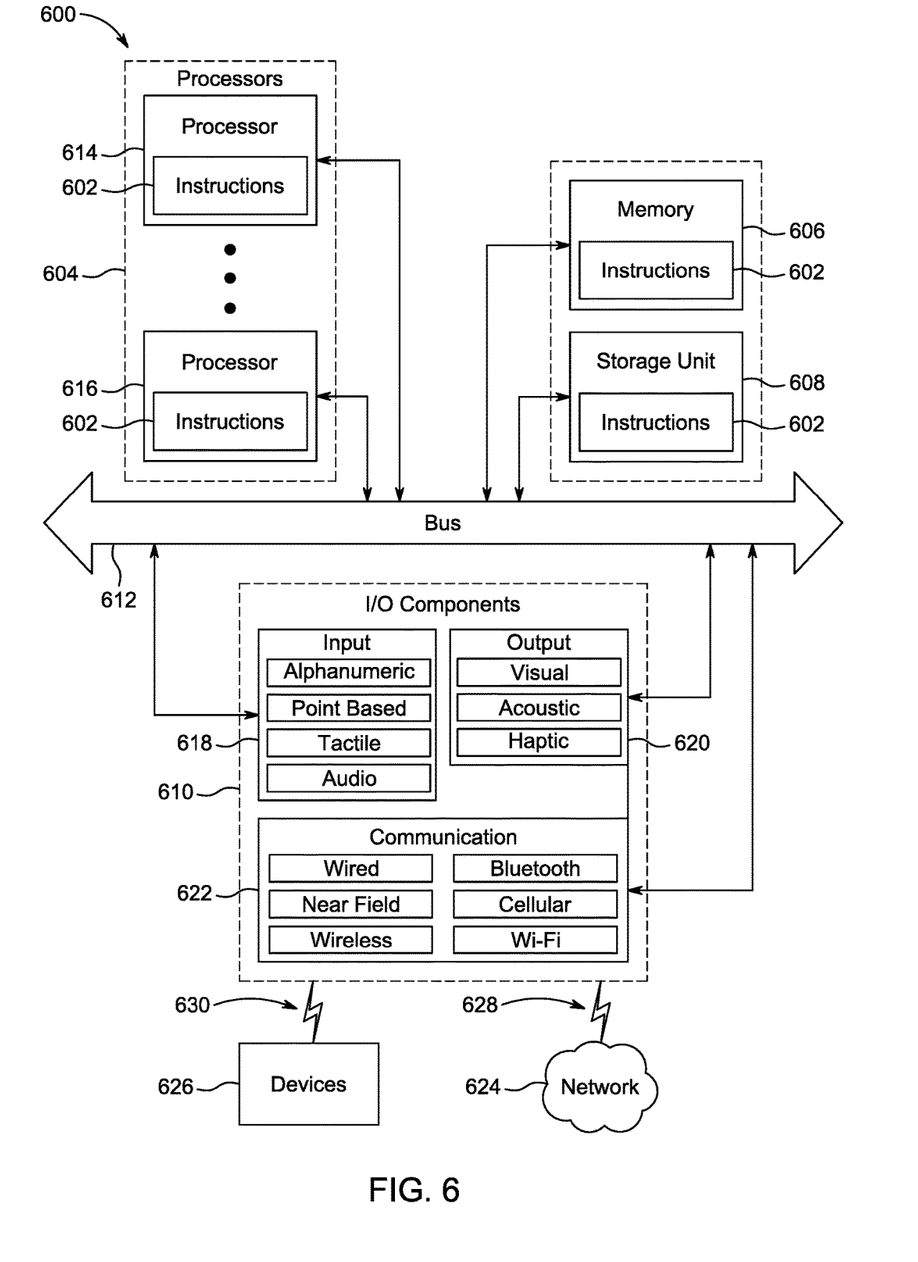
FIG. 6 is a block diagram illustrating components of a machine able to read instructions from a machine-readable medium, according to some embodiments.

FIG. 6 is a block diagram illustrating components of a machine 600, according to some example embodiments, able to read instructions from a machine-readable medium (e.g., a machine-readable storage medium) and perform any one or more of the methodologies discussed herein. The machine 600 may correspond to one or more of the client device 110, the management server 120, or the geographic server(s) 130. Specifically, FIG. 6 shows a diagrammatic representation of the machine 600 in the example form of a system, within which instructions 602 (e.g., software, a program, an application, an applet, an app, a driver, or other executable code) for causing the machine 600 to perform any one or more of the methodologies discussed herein may be executed. For example, the instructions 602 include executable code that causes the machine 600 to execute the methods 200 and 600. In this way, these instructions transform the general, non-programmed machine into a particular machine programmed to carry out the described and illustrated functions in the manner described herein. The machine 600 may operate as a standalone device or may be coupled (e.g., networked) to other machines.

By way of non-limiting example, the machine 600 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 602, sequentially or otherwise, that specify actions to be taken by machine 600. Further, while only a single machine 600 is illustrated, the term "machine" shall also be taken to include a collection of machines 600 that individually or jointly execute the instructions 602 to perform any one or more of the methodologies discussed herein.

The machine 600 may include processors 604, memory 606, storage unit 608 and I/O components 610, which may be configured to communicate with each other such as via a bus 612. In an example embodiment, the processors 604 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 614 and processor 616 that may execute instructions 602. The term "processor" is intended to include multi-core processors that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core process), multiple processors with a single core, multiple processors with multiples cores, or any combination thereof.

The memory 606 (e.g., a main memory or other memory storage) and the storage unit 608 are both accessible to the processors 604 such as via the bus 612. The memory 606 and the storage unit 608 store the instructions 602 embodying any one or more of the methodologies or functions described herein. The instructions 602 may also reside, completely or partially, within the memory 606, within the storage unit 608, within at least one of the processors 604 (e.g., within the processor's cache memory), or any suitable combination thereof, during execution thereof by the machine 600. Accordingly, the memory 606, the storage unit 608, and the memory of processors 604 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 602. The term "machine-readable medium" shall also be taken to include any medium, or combination of multiple media, that is capable of storing instructions (e.g., instructions 602) for execution by a machine (e.g., machine 600), such that the instructions, when executed by one or more processors of the machine 600 (e.g., processors 604), cause the machine 600 to perform any one or more of the methodologies described herein (e.g., methods 200 and 600). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 610 may include a wide variety of components to receive input, provide output, produce output, transmit information, exchange information, capture measurements, and so on. The specific I/O components 610 that are included in a particular machine will depend on the type of machine. For example, portable machines such as mobile phones will likely include a touch input device or other such input mechanisms, while a headless server machine will likely not include such a touch input device. It will be appreciated that the I/O components 610 may include many other components that are not specifically shown in FIG. 6. The I/O components 610 are grouped according to functionality merely for simplifying the following discussion and the grouping is in no way limiting. In various example embodiments, the I/O components 610 may include input components 618 and output components 620. The input components 618 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 620 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 610 may include communication components 622 operable to couple the machine 600 to a network 624 or devices 626 via coupling 628 and coupling 630, respectively. For example, the communication components 622 may include a network interface component or other suitable device to interface with the network 624. In further examples, communication components 622 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 626 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A system comprising:
one or more processors of a machine; and
a memory storing instructions that, when executed by the one or more processors, cause the one or more processors to:
receive, at a management server and from a client device, a request for geographic data of an identified geographic region, the geographic data comprising one or more tiles, and the request having a management server request format;
select, at the management server, a first geographic server for processing the request, the first geographic server being selected out of a plurality of geographic servers;
translate, at the management server, the request from the management server request format into a first geographic server request format, the first geographic server request format operable to communicate with the first geographic server, and a second geographic server from among the plurality of geographic servers communicating using a second geographic server request format different from the first geographic server request format; and
transmit, to the first geographic server, the request translated into the first geographic server request format in order to cause the first geographic server to provide the geographic data to the client device.

2. The system of claim 1, the memory further storing instructions that, when executed by the one or more processors, cause the one or more processors to:
transmit, to the first geographic server, in conjunction with the request translated into the first geographic server request format, a security element for accessing the first geographic server, wherein:
the security element for accessing the first geographic server is different from a security element for accessing the second geographic server, and
the security element for accessing the first geographic server resides at the management server.

3. The system of claim 1, the memory further storing instructions that, when executed by the one or more processors, cause the one or more processors to:
monitor the plurality of geographic servers to verify that each of the plurality of geographic servers is online and has access to tiles associated with the geographic server; and
determine that a third geographic server is offline or does not have access to tiles associated with the third geographic server, wherein the first geographic server is selected from a subset of the plurality of geographic servers, the subset lacking the third geographic server.

4. The system of claim 1, the memory further storing instructions that, when executed by the one or more processors, cause the one or more processors to:
receive, at the management server, the geographic data provided to the client device;
cache the geographic data at a local cache unit of the management server;
receive, from a second client device, a request for the geographic data;
retrieve, in response to the request for the geographic data from the second client device, the geographic data from the cache; and
transmit the retrieved geographic data to the second client device.

5. The system of claim 4, wherein the plurality of geographic servers includes a cache of the management server and at least two additional geographic servers.

6. The system of claim 1, the memory further storing instructions that, when executed by the one or more processors, cause the one or more processors to:
- determine that the first geographic server is unable to provide the geographic data to the client device;
- determine whether an additional geographic server is able to provide the geographic data to the client device;
- in response to determining that the additional geographic server is able to provide the geographic data to the client device:
  - translate, at the management server, the request from the management server request format into an additional geographic server request format, wherein the additional geographic server request format is for communicating with the additional geographic server, and
  - transmit, to the additional geographic server, the request translated into the additional geographic server request format in order to cause the additional geographic server to provide the geographic data to the client device; and
- in response to determining that the additional geographic server is unable to provide the geographic data to the client device: inform the client device that the request for the geographic data cannot be processed.

7. The system of claim 6, wherein the instructions to determine whether the additional geographic server is able to provide the geographic data to the client device comprise instructions that, when executed by the one or more processors, cause the one or more processors to:
- determine that the additional geographic server is online; and
- determine that the additional geographic server has access to the geographic data of the identified geographic region.

8. The system of claim 1, wherein the first geographic server comprises a map server.

9. The system of claim 1, wherein the first geographic server comprises a machine having access to the geographic data that is different from a map server.

10. A non-transitory machine-readable medium storing instructions that, when executed by one or more processors of a machine, cause the machine to:
- receive, at a management server and from a client device, a request for geographic data of an identified geographic region, the geographic data comprising one or more tiles, and the request having a management server request format;
- select, at the management server, a first geographic server for processing the request, the first geographic server being selected out of a plurality of geographic servers;
- translate, at the management server, the request from the management server request format into a first geographic server request format, the first geographic server request format operable to communicate with the first geographic server, and a second geographic server from among the plurality of geographic servers communicating using a second geographic server request format different from the first geographic server request format; and
- transmit, to the first geographic server, the request translated into the first geographic server request format in order to cause the first geographic server to provide the geographic data to the client device.

11. The machine-readable medium of claim 10, further storing instructions that, when executed by the one or more processors, cause the one or more processors to:
- transmit, to the first geographic server, in conjunction with the request translated into the first geographic server request format, a security element for accessing the first geographic server, wherein:
  - the security element for accessing the first geographic server is different from a security element for accessing the second geographic server, and
  - the security element for accessing the first geographic server resides at the management server.

12. The machine-readable medium of claim 10, further storing instructions that, when executed by the one or more processors, cause the one or more processors to:
- monitor the plurality of geographic servers to verify that each of the plurality of geographic servers is online and has access to tiles associated with the geographic server; and
- determine that a third geographic server is offline or does not have access to tiles associated with the third geographic server, wherein the first geographic server is selected from a subset of the plurality of geographic servers, the subset lacking the third geographic server.

13. The machine-readable medium of claim 10, further storing instructions that, when executed by the one or more processors, cause the one or more processors to:
- receive, at the management server, the geographic data provided to the client device;
- cache the geographic data at a local cache unit of the management server;
- receive, from a second client device, a request for the geographic data;
- retrieve, in response to the request for the geographic data from the second client device, the geographic data from the cache; and
- transmit the retrieved geographic data to the second client device.

14. The machine-readable medium of claim 13, wherein the plurality of geographic servers includes a cache of the management server and at least two additional geographic servers.

15. A method comprising:
- receiving, at a management server and from a client device, a request for geographic data of an identified geographic region, the geographic data comprising one or more tiles, and the request having a management server request format;
- selecting, at the management server, a first geographic server for processing the request, the first geographic server being selected out of a plurality of geographic servers;
- translating, at the management server, the request from the management server request format into a first geographic server request format, the first geographic server request format operable to communicate with the first geographic server, and a second geographic server from among the plurality of geographic servers communicating using a second geographic server request format different from the first geographic server request format; and
- transmitting, to the first geographic server, the request translated into the first geographic server request format in order to cause the first geographic server to provide the geographic data to the client device.

16. The method of claim 15, further comprising:
- transmitting, to the first geographic server, in conjunction with the request translated into the first geographic server request format, a security element for accessing the first geographic server, wherein:

the security element for accessing the first geographic server is different from a security element for accessing the second geographic server, and the security element for accessing the first geographic server resides at the management server.

17. The method of claim 15, further comprising:

monitoring the plurality of geographic servers to verify that each of the plurality of geographic servers is online and has access to tiles associated with the geographic server; and determining that a third geographic server is offline or does not have access to tiles associated with the third geographic server, wherein the first geographic server is selected from a subset of the plurality of geographic servers, the subset lacking the third geographic server.

18. The method of claim 15, further comprising:

receiving, at the management server, the geographic data provided to the client device;

caching the geographic data at a local cache unit of the management server;

receiving, from a second client device, a request for the geographic data;

retrieving, in response to the request for the geographic data from the second client device, the geographic data from the cache; and transmitting the retrieved geographic data to the second client device.

19. The method of claim 18, wherein the plurality of geographic servers includes a cache of the management server and at least two additional geographic servers.

20. The method of claim 15, further comprising:

determining that the first geographic server is unable to provide the geographic data to the client device;

determining whether an additional geographic server is able to provide the geographic data to the client device;

in response to determining that the additional geographic server is able to provide the geographic data to the client device:

translating, at the management server, the request from the management server request format into an additional geographic server request format, wherein the additional geographic server request format is for communicating with the additional geographic server, and transmitting, to the additional geographic server, the request translated into the additional geographic server request format in order to cause the additional geographic server to provide the geographic data to the client device; and in response to determining that the additional geographic server is unable to provide the geographic data to the client device: informing the client device that the request for the geographic data cannot be processed.

\* \* \* \* \*